(12) United States Patent
Matsuda et al.

(10) Patent No.: US 7,282,687 B2
(45) Date of Patent: Oct. 16, 2007

(54) IMAGE FORMING APPARATUS HAVING A PROCESSING DECIDING SECTION AND IMAGE FORMATION CONTROLLING METHOD

(75) Inventors: Takashi Matsuda, Nara (JP); Naoki Saito, Hyogo (JP); Fumikazu Shimanuki, Nara (JP); Atsushi Kaseno, Kyoto (JP); Yukio Kanaoka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 24 days.

(21) Appl. No.: 11/279,913

(22) Filed: Apr. 17, 2006

(65) Prior Publication Data

US 2006/0231736 A1  Oct. 19, 2006

(30) Foreign Application Priority Data

Apr. 18, 2005  (JP)  ............................. 2005-120023

(51) Int. Cl.
*H01L 27/00* (2006.01)
(52) U.S. Cl. ................................ 250/208.1; 250/559.4
(58) Field of Classification Search ............ 250/208.1, 250/559.4, 559.3, 221; 355/53, 55; 399/410, 399/407, 408; 412/11, 14, 12
See application file for complete search history.

(56) References Cited

U.S. PATENT DOCUMENTS 5,383,754 A * 1/1995 Sumida et al. ................. 412/11

FOREIGN PATENT DOCUMENTS

| JP | 04-301498 | 10/1992 |
|---|---|---|
| JP | 09-009041 | 1/1997 |
| JP | 10-290309 | 10/1998 |
| JP | 2005-269173 | 9/2005 |

* cited by examiner

*Primary Examiner*—Que T Le
(74) *Attorney, Agent, or Firm*—Renner, Otto, Boisselle & Sklar, LLP (57) ABSTRACT

An image forming apparatus comprising: a document reading section that can read an image of a document; a document-type determining section that can extract, when the image includes a finishing mark or a characteristic form, the finishing mark or the characteristic form as a characteristic portion from the readout document image, and can determine, based on the extracted characteristic portion, a type of the finishing or a type of the document; a processing deciding section that decides, based on the determined type of the finishing or the determined type of the document, a type of finishing to be performed to a medium to be output or a type of image processing to be performed to an image to be output; and a processor that performs finishing of the type decided by the processing deciding section to the medium to be output or image processing of the type decided by the processing deciding section to the image to be output.

15 Claims, 10 Drawing Sheets

DOCUMENT MANAGEMENT TABLE

| NUMBER OF PAGES | CHARACTERISTICS | ... |
|---|---|---|
| PAGE 1 | STAPLE | ... |
| PAGE 2 | STAPLE | ... |
| PAGE 3 | STAPLE | ... |
|  | : | : |
| PAGE N | STAPLE | ... |

IMAGE FORMING APPARATUS HAVING A PROCESSING DECIDING SECTION AND IMAGE FORMATION CONTROLLING METHOD

CROSS-REFERENCE TO RELATED APPLICATION

This application is related to Japanese Patent Application No. 2005-120023 filed on Apr. 18, 2005, whose priority is claimed and the disclosure of which is incorporated by reference in its entirety.

BACKGROUND OF THE INVENTION

1. Field of the Invention

The present invention relates to an image forming apparatus and an image formation controlling method. In particular, the present invention relates to an image forming apparatus and an image formation controlling method with which a type of or a processing performed to a document that has been read, and a processing to be performed to an output media or an output image is determined based on the detection result.

2. Description of the Related Art

Examples of conventional image forming apparatuses include a digital copying machine. The digital copying machine reads an image of a document set on a reading section with an image sensor such as a CCD, and resolves it into pixels, and then, the machine performs an image processing to digital data corresponding to each pixel, thereby printing the digital data. Recently, there has been proposed an image forming apparatus capable of performing various kinds of image editing and various kinds of post processing (finishing) by using a finishing device. These include image editing in which document images for a plurality of pages are scaled down so as to be laid out in one page and printed, and finishing such as stapling or punching at a predetermined position of a set of printed output or folding of a sheet at a predetermined position.

However, an operation of laying out a plurality of document images in a single page or designating a position of staple or punch holes as an operator intends is not simple, and various selections must be appropriately made on the operating screen so as to set functions to obtain an output as intended by the operator. In order for a selection to be appropriate, meaning of the choices displayed on the operating screen must be understood. Further, when a document is set on the reading section, the document must be set in an appropriate direction. Such an operation can be confusing to an operator who is unfamiliar with the operation.

In order to reduce the burden of an operator, there has been proposed a device in which an operator specifies an intended processing position in a mark sheet, and the device reads the processing position indicated on the mark sheet so as to perform the finishing at the corresponding position of the printed output (see Japanese Patent Application Laid-open No. H04-301498, for example).

Further, there may be a case where outputting of a copy faithful to a document does not meet an operator's intention. An unnecessary image can be included in a document image that has been read. For example, it is reasonable to understand that punch holes in the document are unnecessary images. In view of this, there has been proposed a device which determines a portion for a punch hole in a document image and delete or unfill the determined portion (see Japanese Patent Application Laid-open No. H09-9041, for example). As described above, although separate and specific processing of a document image has been proposed, image editing and finishing is generally considered as being set by the operator according to his/her intention. In other words, in a conventional copying machine, there has been a tendency to focus on faithful reproduction of a document image.

However, a faithful reproduction of a document is often required to be faithful to the document including physical processing forms provided to the document. That is, in a recent image forming apparatus having various image editing functions and finishing functions, there is required such an apparatus being capable of detecting not only a document image but also the image editing and finishing performed to the document, and determining a processing to be performed to a printed output based on the detection result to produce a reproduction of the document.

SUMMARY OF THE INVENTION

It is therefore an object of the present invention to provide an image forming apparatus which automatically determines a post processing to be performed on an output based on a readout document image, and produces a copy of the document including processing forms without requiring complicated operation by an operator.

The present invention provides an image forming apparatus including: a document reading section that can read an image of a document; a document-type determining section that can extract, when the image includes a finishing mark or a characteristic form, the finishing mark or the characteristic form as a characteristic portion from the readout document image, and can determine, based on the extracted characteristic portion, a type of the finishing or a type of the document; a processing deciding section that decides, based on the determined type of the finishing or the determined type of the document, a type of finishing to be performed to a medium to be output or a type of image processing to be performed to an image to be output; and a processor that performs finishing of the type decided by the processing deciding section to the medium to be output or image processing of the type decided by the processing deciding section to the image to be output.

The image forming apparatus of the present invention includes: the document-type determining section that can extract, when the image includes a finishing mark or a characteristic form, the finishing mark or the characteristic form as a characteristic portion from the readout document image, and can determine, based on the extracted characteristic portion, a type of the finishing or a type of the document; and the processing deciding section that decides, based on the determined type of the finishing or the determined type of the document, a type of finishing to be performed to a medium to be output or a type of image processing to be performed to an image to be output. With this, the device is capable of determining appropriate finishing or image processing to be performed to an output, based on the finishing performed to the document. Therefore, it is possible to produce a reproduction of the document including processing form of the finish without any complicated operation.

The image forming apparatus of the present invention includes: the document reading section that can read an image of a document; the document-type determining section that can extract, when the image includes a finishing mark or a characteristic form, the finishing mark or the characteristic form as a characteristic portion from the readout document image, and can determine, based on the extracted characteristic portion, a type of the finishing or a type of the document; the processing deciding section that decides, based on the determined type of the finishing or the determined type of the document, a type of finishing to be performed to a medium to be output or a type of image processing to be performed to an image to be output.

The document may be in a sheet form, and the document reading section may include a document auto-feeder which feeds a plurality of sheets sequentially and read them, but the present invention is not limited to this configuration. For example, the form of the document may be in a book bound with a cord through the punch holes.

The characteristic portions in the image may be extracted by collating characteristic image patterns stored in advance with the readout document image. Further, the characteristic portions of the document are not limited to the image within the document area but may be a contour shape of the document. For example, if a corner of a document having a rectangle contour is folded, it may be determined that the corner of the document is stapled.

The finishing mark may be a mark being left on the document as a result of the finishing being performed to the document. Namely, the marks of finishing mean the marks of the finishing that has been physically performed to the document. For example if processing is punching, dark parts caused since reflection from the sheet surface is not obtained in the holes, or shades of the holes may be extracted as the processing marks. If processing is stapling, two small holes arranged with a certain distance to each other may be extracted as the processing marks.

Further, when the document has images on a front side and a back side of a sheet, the document reading section may read the images on both sides of the sheet, and the document-type determining section may determine, when it extracts finishing marks of the same kind respectively provided on the readout images on both sides of the sheet, that the finishing has been performed to the document. With this, the processing performed to the document is determined by judging characteristics and positions on the front and back of the sheets, so more accurate determination is possible comparing with the case where characteristics are determined based on only one document image on either of the front and the back sides.

If the processing form of the document is determined erroneously, in the case of stapling, it is possible to perform again while removing a staple by hand. However, if punch holes are formed in error, there is no means to recover, so all outputs have to be wasted. In order to prevent such waste, it is preferable to determine finishing more accurately. Therefore, it is effective to collate characteristics of the front and back of the document in order to improve reliability of the determination.

Alternatively, wherein when the document has images on each side of a plurality of sheets, the document reading section may read the images as one set, and the document-type determining section may determine, when it extracts finishing marks of the same kind in each sheet of the set, that the finishing has been performed. With this, determination relating to stapling or punching to be processed by a set is performed for all sheets of the set, so more accurate determination is possible comparing with the case where characteristics are determined based on only one document image on either of the front and the back sides.

In the determination, if it is determined that the same kind of processing mark is provided at the same position at a rate not less than a threshold, the set may be processed collectively even if not all of the determination results of the document in the set are coincided. With this process, determination will not result in error even when a processing mark in any sheet could not be extracted correctly. Accordingly, more reasonable determination may be performed comparing with the case where processing to a set is performed only when all determination results of the sheets are coincided. Which is to be adopted may be determined according to the accuracy of characteristic extraction.

The device may be so configured that the document-type determining section extracts a fold line of the document as a characteristic portion. Further, the document-type determining section may extract a staple mark of the document as the characteristic portion, or extract a punch mark of the document as the characteristic portion.

The processing deciding section may decide that the same finishing which has been performed to the document should be performed to the medium to be output. The processing deciding section decides the content of output processing from the determined processing form of the document, but in many cases, it is preferable to perform the same processing as processing form of the document. For example, if the document is determined as being punched, it is often preferable that punch holes be formed at almost the same position of an output sheet. If the document is determined as being stapled, it is often preferable that stapling be performed at almost the same position of the output sheet. The reason why almost the same position is mentioned here is that there may be a case where completely the same position is difficult due to readout tolerance of the document or limitation in accuracy of a finishing device. Accordingly, it is convenient for an operator if processing same as the form determined by the document-type determining section is performed to the output.

Alternatively, the processing deciding section may decide that processing as a substitute for the same finishing which has been performed to the document should be performed to the medium to be output or the image to be output. When the processing deciding section determines that the same processing as the processing form of the document is impossible but different processing is possible, it performs processing different from the processing form of the document to an output. For example, if the stapled position of the document is a position where the image forming apparatus cannot perform stapling, stapling may be performed at a substitute position where stapling is possible. Alternatively, if the punched position of the document is a position where the image forming apparatus cannot perform punching, image processing may be performed so as to eliminate marks of the punch holes. It is convenient for the operator if processing different from the form of the document determined by the document-type determining section is performed to the output corresponding to the situation.

The image forming apparatus may further include a notification section that notifies the operator of the processing decided by the processing deciding section or the type of processing decided by the processing deciding section. With this configuration, it is informed to the operator that what kind of processing has been performed by the image forming apparatus, so the operator can check the content of processing at the time of output.

The image forming apparatus may further include a processing instruction section that allows the operator to input an instruction in response to the notification. With this configuration, the operator checks the content of processing determined by the image forming apparatus before execution, so it is possible to avoid processing unintended by the operator which results in the output being wasted.

Further from different point of view, the present invention provides an image formation controlling method including: a document reading step of reading an image of a document; a document-type determining step of extracting, when the image includes a finishing mark or a characteristic form, the finishing mark or the characteristic form as a characteristic portion from the readout document image, and determining, based on the extracted characteristic portion, a type of the document or a type of the finishing; a processing deciding step of deciding, based on the determined type of the document or the determined type of the finishing, a type of finishing to be performed to a medium to be output or a type of processing to be performed to an image to be output; and a processing step of performing finishing of the type decided by the processing deciding section to the medium to be output or image processing of the type decided by the processing deciding section to the image to be output.

The finishing mark may be a mark being left on the document as a result of the finishing being performed to the document.

Alternatively, when the document has images on both sides of a sheet, the document reading step may be a step of reading the images on both sides of the sheet, and the document-type determining step is a step of determining, when finishing marks of the same kind respectively provided on the readout images on both sides of the sheet are extracted as the characteristic portion, that the finishing has been performed to the document.

Alternatively, the document has images on each of a plurality of sheets, the document reading step is a step of reading the images as one set, and the document-type determining step is a step of determining, when finishing marks of the same kind one in each sheet of the set are extracted as the characteristic portion, that the finishing has been performed. With this, determination relating to stapling or punching to be processed is performed for all sheets of the set, so more accurate determination is possible comparing with the case where characteristics are determined based on only one document image on either of the front and the back sides.

DETAILED DESCRIPTION OF THE PREFERRED EMBODIMENTS

Hereinafter, the present invention will be explained in more detail by using the drawings.

Figure 1:
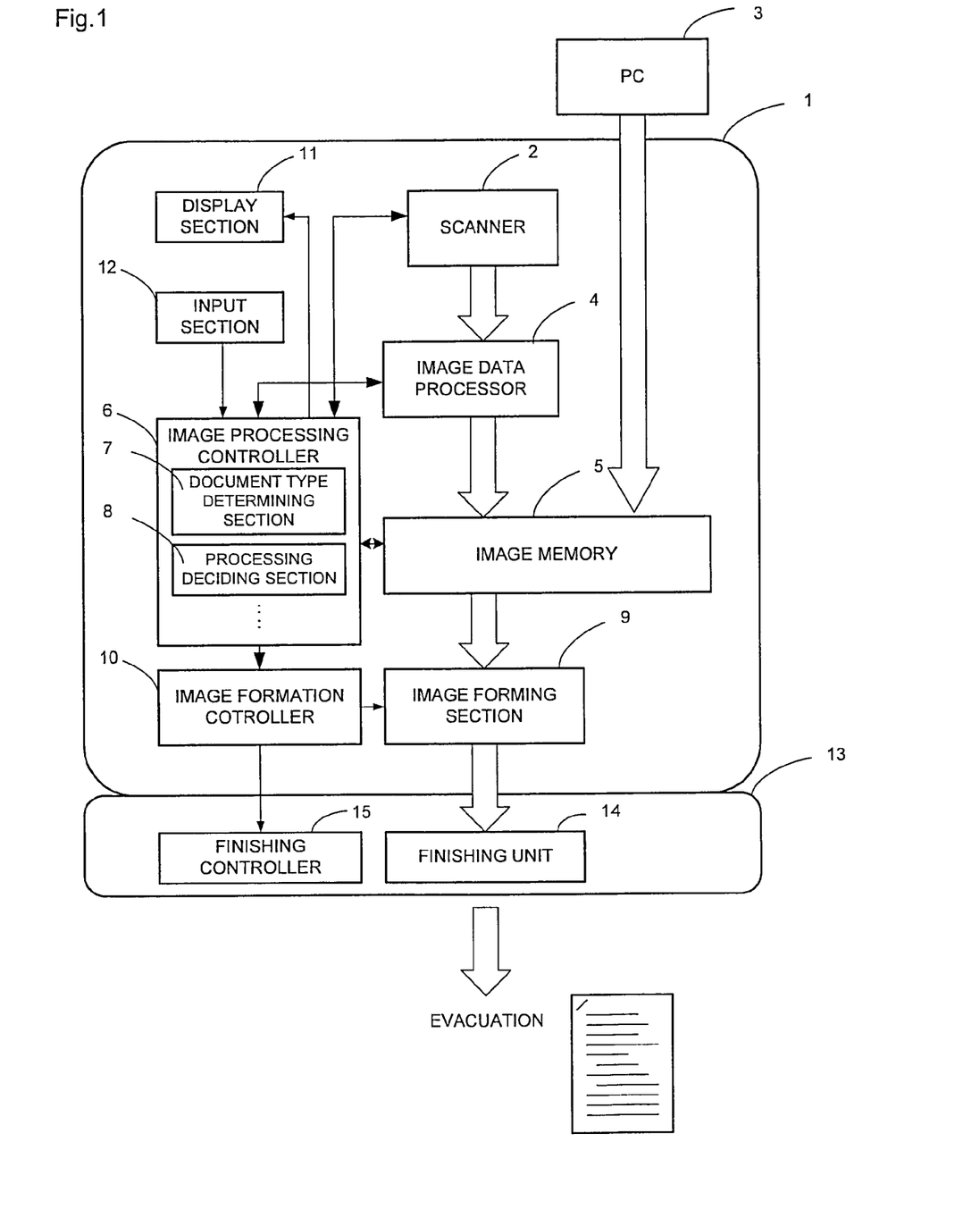
FIG. 1 is a block diagram showing an exemplary hardware configuration of an image forming apparatus of the present invention.

FIG. 1 is a block diagram showing an exemplary configuration of an image forming apparatus of the present invention. In FIG. 1, an image forming apparatus 1 includes a scanner 2 serving as a document reading section which reads an image of a document. The scanner 2 reads the document image and outputs image data. The scanner 2 may be such that scans the document placed on a platen. Alternately, the scanner 2 may be such that the document in a sheet form is transported by a document feeder not shown, and when the fed document passes through an image sensor unit not shown, the document image is read. Further, the scanner 2 may be provided with the duplex functions. Further, the image forming apparatus 1 may be configured to be capable of receiving print data from an external personal computer (PC) 3.

An image data processor 4 is a block which processes image data of the document read by the scanner 2 or print data received from the PC 3. For example, the image data processor 4 corrects image data of each pixel read by the scanner 2 based on data for shading correction, and further, performs filtering to the image data to obtain a preferable image quality. In addition, the image data processor 4 performs editing such as rotational processing performed to the readout document image. The image data processor 4 may be constituted from an ASIC and a buffer memory that are designed exclusively. An image memory 5 is for temporarily storing the image data or print data processed by the image data processor 4, and constituted from a DRAM.

An image controller 6 controls the scanner 2 and the image data processor 4, and performs processing to the image data stored in the image memory 5. The processing includes processing as a document-type determining section 7 and processing as a processing deciding section 8. The document-type determining section 7 extracts characteristic portions from the document image, and determines a form of the document (type of document or type of finishing having been performed to the document). The processing deciding section 8 decides processing to be performed to a printed output based on the determination of the document-type determining section 7. The processing also includes development processing for converting the print data to image data which can be transmitted to an image forming section 9 described later. The hardware of the image controller 6 is constituted from a CPU and a ROM storing programs executed by the CPU.

The image forming section 9 is for outputting a printed matter which is made to be viewable by printing the image data stored in the image memory 5 on a sheet, and is a printer engine of an electrophotographic system. An image formation controller 10 is for controlling operation of the image forming section 9, and is constituted from a microcomputer and an input/output circuit.

Further, the image forming apparatus 1 includes a display section 11 which notifies contents decided by the processing deciding section 8 to the operator by displaying them, and an input section 12 for causing the operator to input an instruction corresponding to the decided contents.

The finishing device 13 is a device for performing finishing such as stapling or punching to a sheet outputted from the image forming section 9. The finishing device 13 includes: a finishing unit 14 which transports a sheet outputted from the image forming apparatus 1 and performs the above-described processing; and a finishing controller 15 which controls the finishing unit 14. The finishing controller 15 is constituted from a microcomputer and an input/output circuit.

Figure 2:
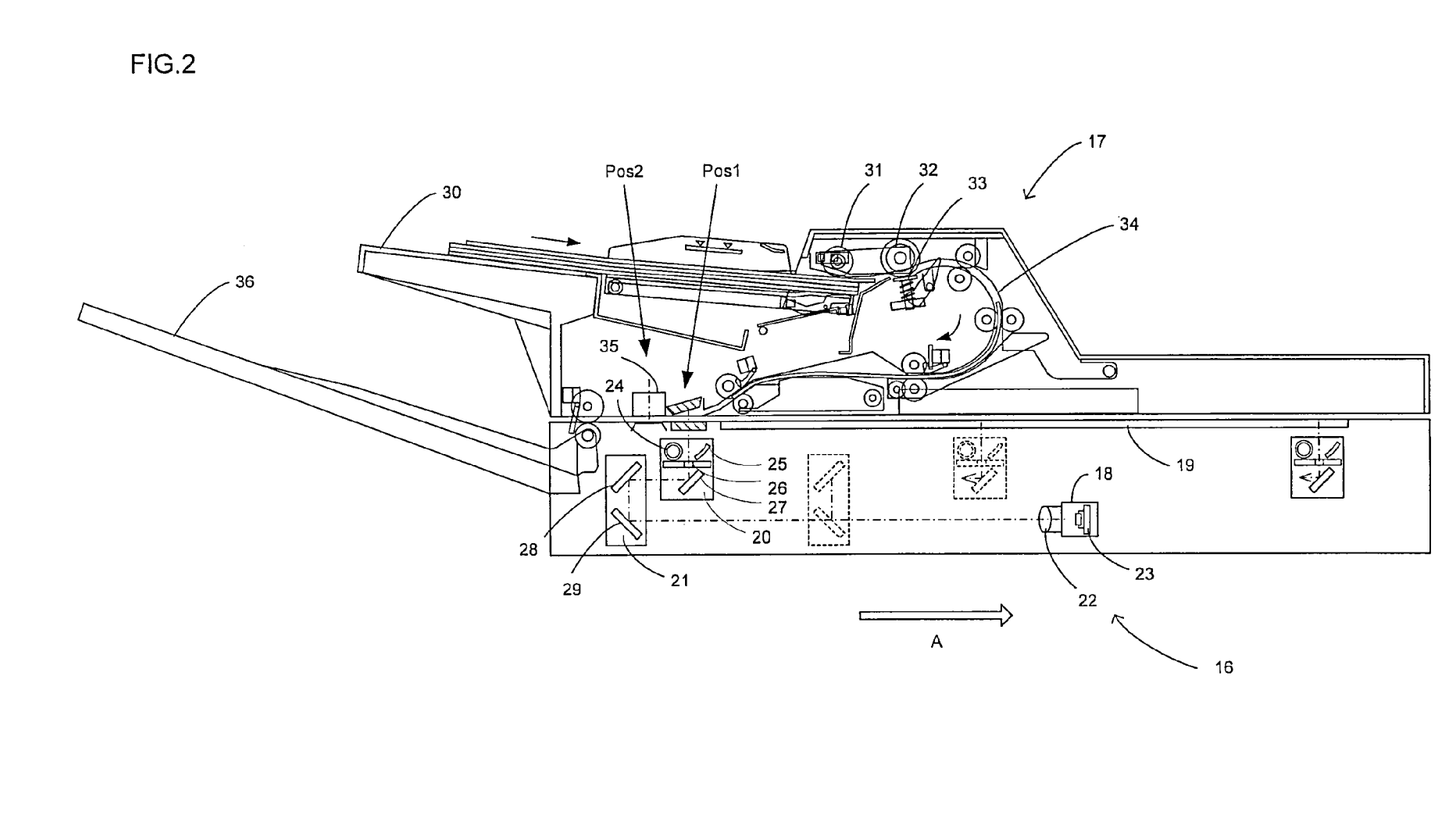
FIG. 2 is a sectional view showing an embodiment of the scanner of FIG. 1.

FIG. 2 is a sectional view showing a mechanical embodiment of the scanner 2 in FIG. 1. The scanner 2 mainly is constituted from an optical system 16 and a document feeder 17 disposed above the optical system 16. The document feeder 17 can read a front side and the rear side (the both faces) of the document.

The optical system 16 includes a CCD reading unit 18 provided at a fixed position. An image of the document placed on a document platen 19 (platen glass) is imaged on the CCD reading unit 18 through a light source unit 20 and a mirror unit 21. The CCD reading unit 18 includes an imaging lens 22 and a CCD image sensor 23, and outputs electric signals corresponding to the document image.

In more detail, the light source unit 20 includes a light source lamp 24, a reflector 25, a slit 26 and a first mirror 27. The light source lamp 24 irradiates the document on the document platen 19. The document reflector 25 makes light irradiated from the light source lamp 24 condensed at a reading position on the document platen 19. The slit 26 transmits light reflected from the document face of the reading position. The first mirror 27 reflects the light passing through the slit 26 so as to bend the direction by 90 degrees.

The mirror unit 21 causes light guided from the light source unit 20 to be reflected at two mirrors to thereby bend the light direction by 180 degrees. To do so, the mirror unit 21 includes a pair of second mirror 28 and third mirror 29. In order to read the whole surface of the document placed on the document platen 19, the light source unit moves from one end to the other end in a direction shown by an arrow A (sub scanning direction). Assuming that the moving speed of the light source unit 20 is V, the mirror unit 21 moves in a direction of the arrow A at a speed of V/2. Thereby, the optical path length from the document surface to the imaging face of the CCD reading unit 18 is kept constant, whereby the whole surface of the document can be read clearly.

Further, the image forming apparatus 1 includes a document size detector, not shown in FIG. 2, which detects a size of the document placed on the document platen 19. When reading the document, the light source unit 20 moves a predetermined distance corresponding to the size detected by the document size detector.

Further, the scanner 2 is also capable of transporting the document by the document feeder 17 and reading the document transported in a state where the light source unit 20 is stopped at the position of Pos1. The document feeder 17 takes in the sheets of the document placed on a document tray 30 in a bundle, one by one, by a pickup roller 31. One sheet of the document taken is surely separated by an action of a feeding roller 32 and a separating plate 33, and is transmitted to a curve transporting path 34. Then, the document is transported toward the position of Pos1 where the light source unit 20 is stopped. Note that the curve transporting path 34 has a curvature with which all kinds of documents conforming to the specification can be supplied stably. In other words, the curvature is set to one with which a thickest document, that is, the most firm document, among the documents conforming to the specification, can be transported smoothly. When the document passed through the curve transport path 34 passes the position of Pos1, the image of the lower face thereof is read out by the CCD reading unit 18. Further, when passing the position of Pos2, the image of the upper face thereof is read out by a contact-type image sensor 35 provided on the upper face side of the document transporting path. The document which has been read out is ejected to a document sheet exit tray 36. On the other hand, image data of the readout document is temporarily stored in the image memory 5. Then, the characteristics of the document are extracted by the document type determination section 7. Further, the processing deciding section 8 decides processing to be performed to a printed output based on the extracted characteristics, and sends an instruction to the image formation controller 10 based on the decision. Further, the image data stored in the image memory 5 is transmitted to a printer engine which is the image forming section 9. Upon receiving the instruction from the processing deciding section 8, the image formation controller 10 controls the image forming section 9 so as to cause it to perform image formation, and forms an image on a recording sheet and outputs it.

The document feeder 17 is adapted to rotate upward with a hinge (not shown) provided in between the optical system 16 being a rotational fulcrum, at the backside of the image reading device (at the back of the sheet in FIG. 2). Thereby, the document feeder 17 is adapted to be held upward from the front side of the sheet face so as to open the upper face of the document platen 19. In this way, the document in a book form or the like, which cannot be transported by the document feeder 17, can be set on the document platen 19.

Figure 3:
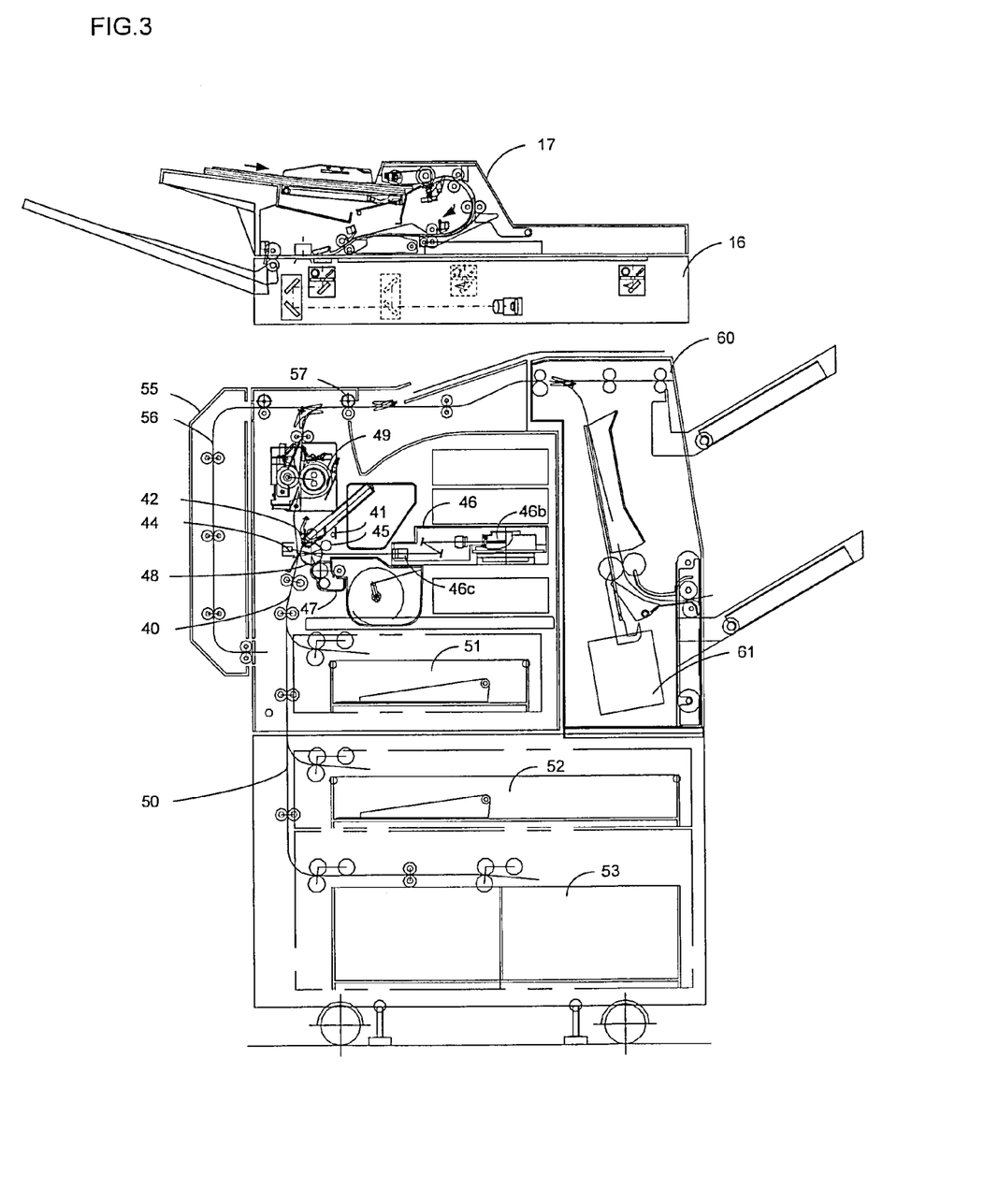
FIG. 3 is a sectional view showing an embodiment of the image forming section of FIG. 1.

FIG. 3 is a sectional view showing one form of the image forming section 9 shown in FIG. 1. As shown in FIG. 3, the image forming section 9 includes: a transporting system for a sheet as a record material; a laser writing unit 46; and an electrophotographic process unit for forming an image. The sheet transporting system transports a sheet on which an image is formed. The laser writing unit 46 includes a semiconductor laser light source (not shown), a polygon mirror 46b, and an f-θ lens 46c. The semiconductor laser light source, not shown, emits a laser beam corresponding to the image data read out from the image memory 5. The polygon mirror 46b deflects the outputted laser beam at an equiangular speed. The f-θ lens 46c corrects such that the deflected laser beam scans the surface of a photoconductor drum in the electrophotographic process unit at an equal speed.

The electrophotographic process unit includes a charging unit 45, a developing unit 47, a transfer unit 44, a separation unit 43, a cleaning unit 42, and an electrostatic discharger 41 around the photoconductor drum 48.

On the other hand, the sheet transporting system includes a sheet transporting section 40, sheet feeding cassettes 51, 52 and 53, a fuser 49, and a resupplying unit (automatic duplex unit, ADU) 55. The sheet transporting section 40 transports a sheet to a transfer position particularly where the transfer unit 44 is disposed, in the electrophotographic process unit. The sheet feeding cassette 51, 52 or 53 sends a sheet accommodated in each cassette to the sheet transporting section 40. The fuser 49 fixates an image, particularly a toner image, formed on the sheet after transfer. The resupplying unit 55 resupplies a sheet to the sheet transporting section 40 so as to form an image again on the back face of the sheet after fixation.

On the downstream side of the fuser 49, a finishing device 60 is disposed. The finishing device 60 receives a sheet on which the image is written, and makes the sheet offset and performs predetermined processing such as stacking, stapling or punching.

The laser writing unit 46 scans the surface of the photoconductor drum 48 with a laser beam. The image data read out from the image memory 5 shown in FIG. 1 controls the emitting of the semiconductor laser light source in the laser writing unit 46. Thereby, an electrostatic latent image corresponding to the image data is formed on the surface of the photoconductor drum 48. The electrostatic latent image formed is made into a visible image by the toner supplied from the developing unit 47 so as to become a toner image. The toner image is electrostatically transferred onto a sheet fed from any one of the sheet feeding cassettes 51, 52 and 53 and is fixated by the fuser 49.

In this way, the sheet in which image is transferred on the surface thereof is transported to the finishing device 60 via the fuser 49 and the body sheet exit roller 57. The finishing device 60 performs stapling by a stapler or punching by a puncher not shown according to the control of the image formation controller 10.

First Embodiment

In this embodiment, an exemplary procedure for extracting characteristics of a readout document and performing processing will be explained.

Figure 4:
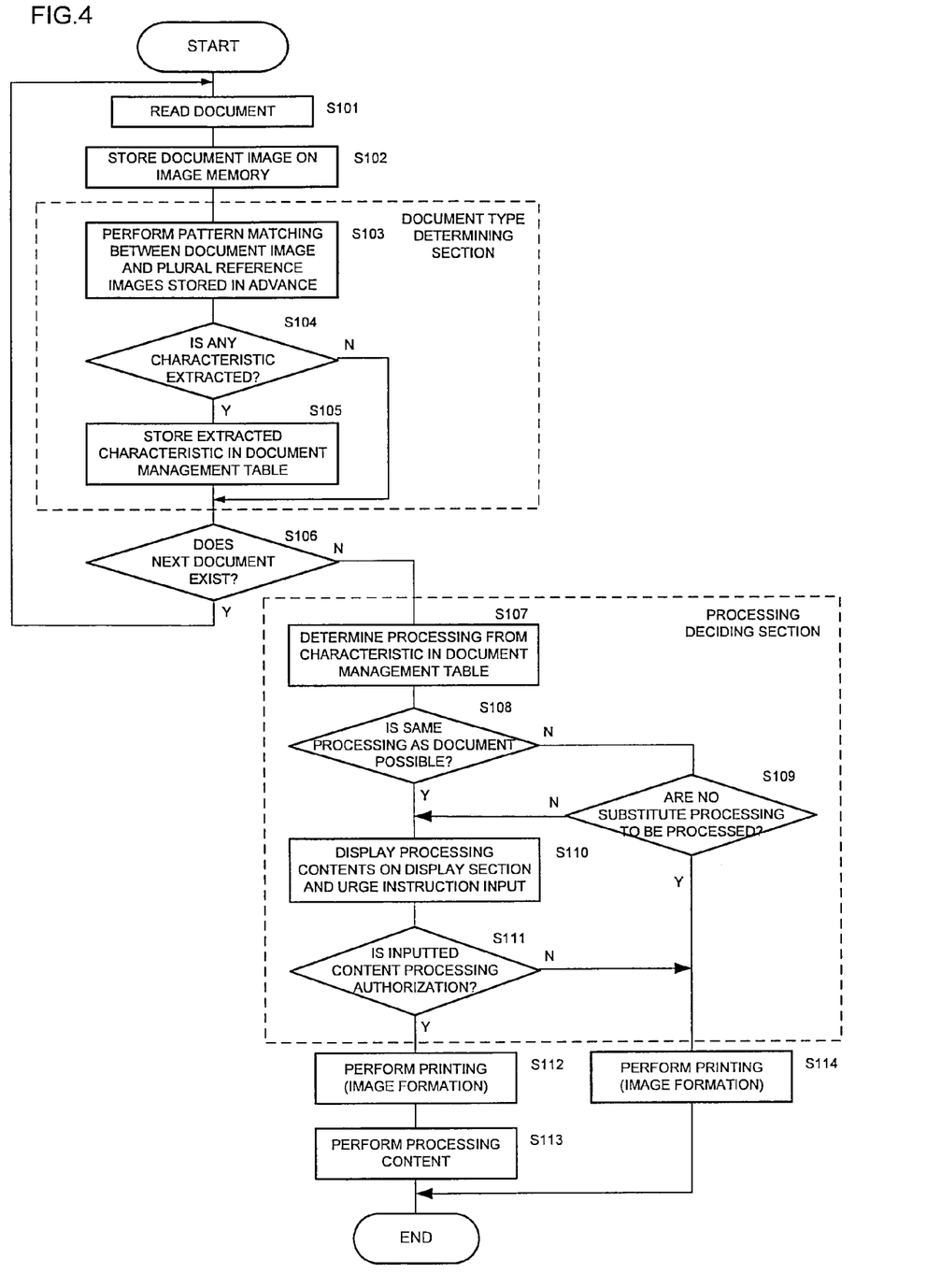
FIG. 4 is a flowchart showing an exemplary processing procedure of the image processing control section of a first embodiment.

FIG. 4 is a flowchart showing an exemplary processing procedure of the image processing controller 6 in this embodiment.

As shown in FIG. 4, the image processing controller 6 causes the scanner 2 to operate so as to read the document image (step S101), and after readout, causes the image data processor 4 to process the readout image, and stores the document image which has been image-processed in the image memory 5 (step S102). After the document image is stored in the image memory 5, the image controller 6 carries out processing as the document-type determining section 7. That is, the image controller 6 carries out pattern matching between the reference images stored in advance for extracting characteristics of the document and the document image stored in the image memory 5 (step S103).

The image controller 6 has a document management table for storing attributes of each page of the document. The document management table has fields for storing extraction results, when characteristic images are extracted from the image data of the document, as the attributes of the document. The image controller 6 determines whether characteristic images are extracted from the document image as the result of pattern matching (step S104). When characteristic images are extracted, the result is stored in a field of the corresponding page in the document management table (step S104). In contrast, if no characteristic image is extracted from the document image, it is determined that the document has no characteristic, so nothing is stored in the document management table.

Figure 8:
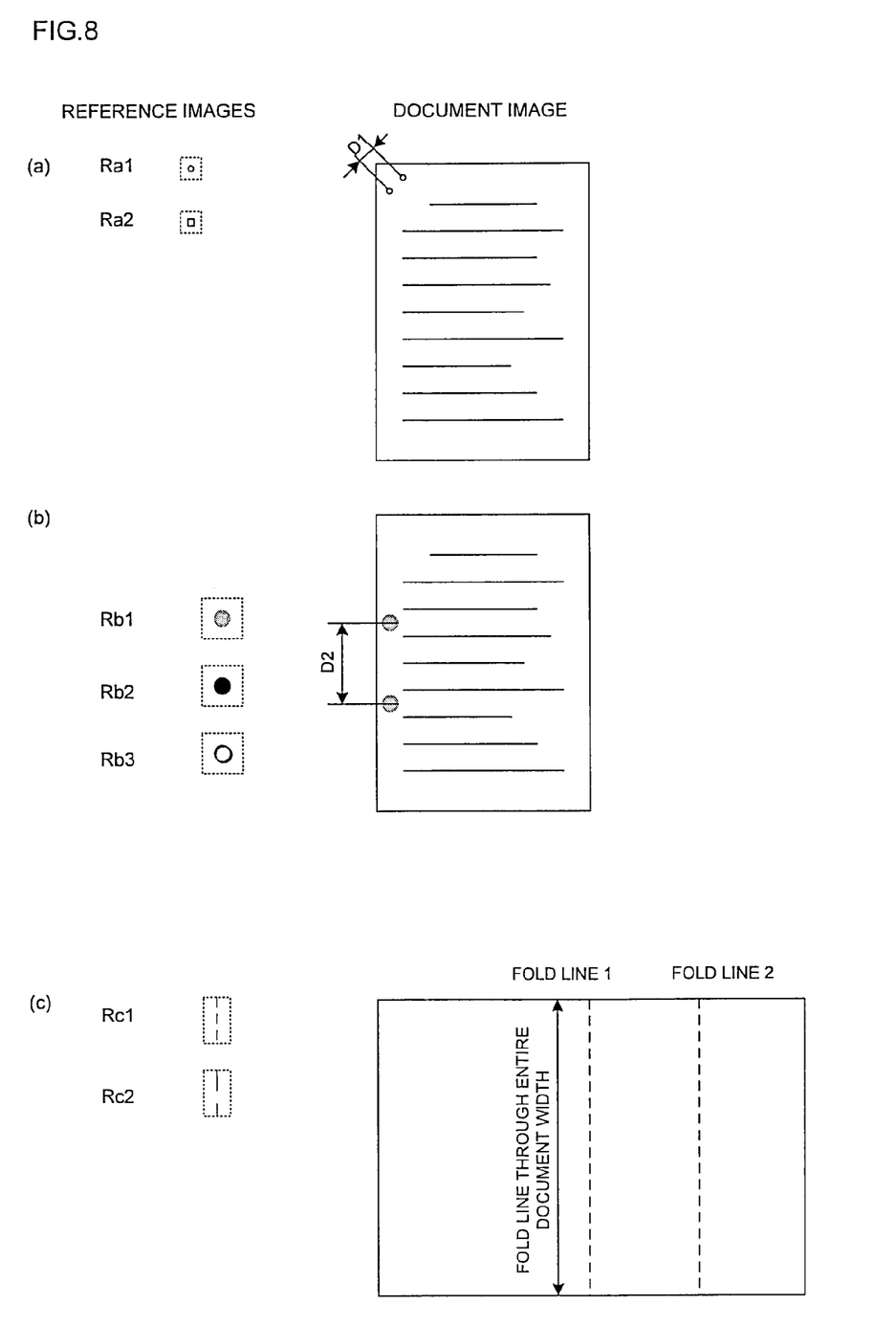
FIG. 8 is an illustration showing exemplary objects of pattern matching performed by a document-type determining section according to the present invention.

FIG. 8 is an illustration showing exemplary objects of pattern matching performed by the document-type determining section 7. FIG. 8A shows that reference images Ra1 and Ra2 showing staple marks are compared with the document image and it is determined whether the document is stapled. Although Ra1 and Ra2 are different patterns, each one corresponds to a hole mark of stapling. A frame shown by a rectangle of broken lines shows a reference pattern stored. The document-type determining section 7 finds a characteristic image conforming to Ra1 in a document surrounding part. If the conforming image is found, the position of the characteristic portion in the document image is stored. Further, the document-type determining section 7 finds a characteristic image conforming to Ra2 in the document image, and if the conforming image is found, the position is stored. As a result, if two or more characteristic images conforming to Ra1 or Ra2 are found, the section finds a pair spaced apart by a predetermined distance D1 to each other, among the pairs. If a corresponding pair is found, the pair is determined as staple marks of the document. Then, the determination result is stored in the field of the corresponding page of the document management table.

The document-type determining section 7 may determines the type of the document. For example, the document-type determining section 7 may extract a fact that a tab exists in the contour shape of the document as a characteristic portion, and determine whether the document is of tab paper. Alternatively, the document-type determining section 7 may detect darkness of the background of the document as a characteristic portion, and if the detection result is not less than a predetermined darkness, determine whether the document is of color paper. Alternatively, the document-type determining section 7 may detect a fact that the document does not include an image as a characteristic portion, and determine the document is inserting paper.

Figure 7:
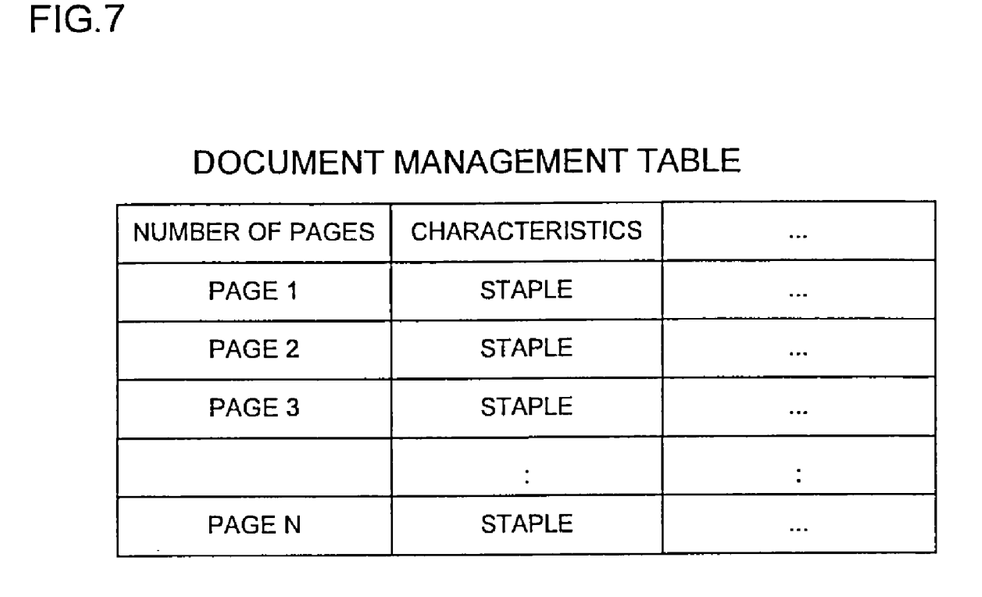
FIG. 7 is an illustration showing an example of a document management table.

FIG. 7 is an illustration showing an example of the document management table. FIG. 7 shows a case where staples are extracted in every page of the document.

FIG. 8B shows a case that reference images Rb1 and Rb2 showing punch marks are compared with the document image so as to determine whether the document is punched. Rb1, Rb2 and Rb3 are different patterns of punch marks, and each shows one punch hole mark. The comparing procedure is same as that of the case of staple marks described above. If a pair of punch hole marks spaced apart by a predetermined distance D2 are found, the pair is determined as punch hole marks of the document. Then, the determination result is stored in the field of the corresponding page of the document management table.

FIG. 8C shows a case where reference images Rc1 and Rc2 showing fold lines are compared with the document image so as to determine whether the document is folded. Rc1 and Rc2 are different folding patterns. As for folding, if there is a continuous pattern from one end to the other end of the document, it is determined as a fold line.

The image controller 6 determines whether there is a next document after reading each page and performing a document type determination processing (step S106). If there is a next document, the routine returns to step S101, and the next document is read and the document type determination processing is performed. On the other hand, if the image controller 6 determines that next document does not exist, it decides processing to the output as the processing deciding section 8. In order to decide processing, the processing deciding section 8 refers to the characteristic portions of each page stored in the document management table, and decides processing performed to the printed output (step S107).

In the example of the document management table in FIG. 7, all pages of the document are stapled. Further, the document-type determining section 7 has determined the stapled positions of the document and stored them in the document management table, so it also determines whether stapling is possible for the output at the same positions as the document by a set section (step S108). Here, if the finishing device 13 does not have a stapling function, the same processing as the document is impossible. Further, although the finishing device 13 capable of stapling is mounted, stapling same as that in the document may not be performed if there is no staple, or stapling position of the finishing device 13 has a limitation so stapling is not possible at the same position as the document, or the number of the document exceeds the maximum number of stapling. If the same processing as that of the document cannot be performed, the routine moves to step S109, and it is determined whether appropriate substitute processing is possible. For example, in the case where stapling can be performed at a position as close as possible to the document within the limited range of the stapling position, it is determined that substitute processing is possible. On the other hand, if stapling is impossible, the staple marks are erased as substitute processing.

If substitute processing is possible, the routine moves to step S110. Further, if it is determined that the same processing as the document is possible in the above-described step S108, the routine also moves to step S110. Then, processing contents or substitute processing contents decided are displayed on the display section. Thereby, the operator is prompted to input whether he/she accepts the processing decided by the processing deciding section 8. When an input is performed, if it is an authorization of processing, the image forming section 9 performs printing (step S112), and the finishing device 13 performs the authorized finishing (step S113). For example, if the processing deciding section 8 decides to perform stapling at a position near the document from the document management table of FIG. 7 and the processing is authorized by the operator, the authorized stapling is performed to the printed output.

On the other hand, if it is determined that there is no appropriate substitute processing in step S109, or if an instruction inputted in step S111 is not an authorization of processing, printing and outputting are performed without performing the processing (step S114).

Figure 9:
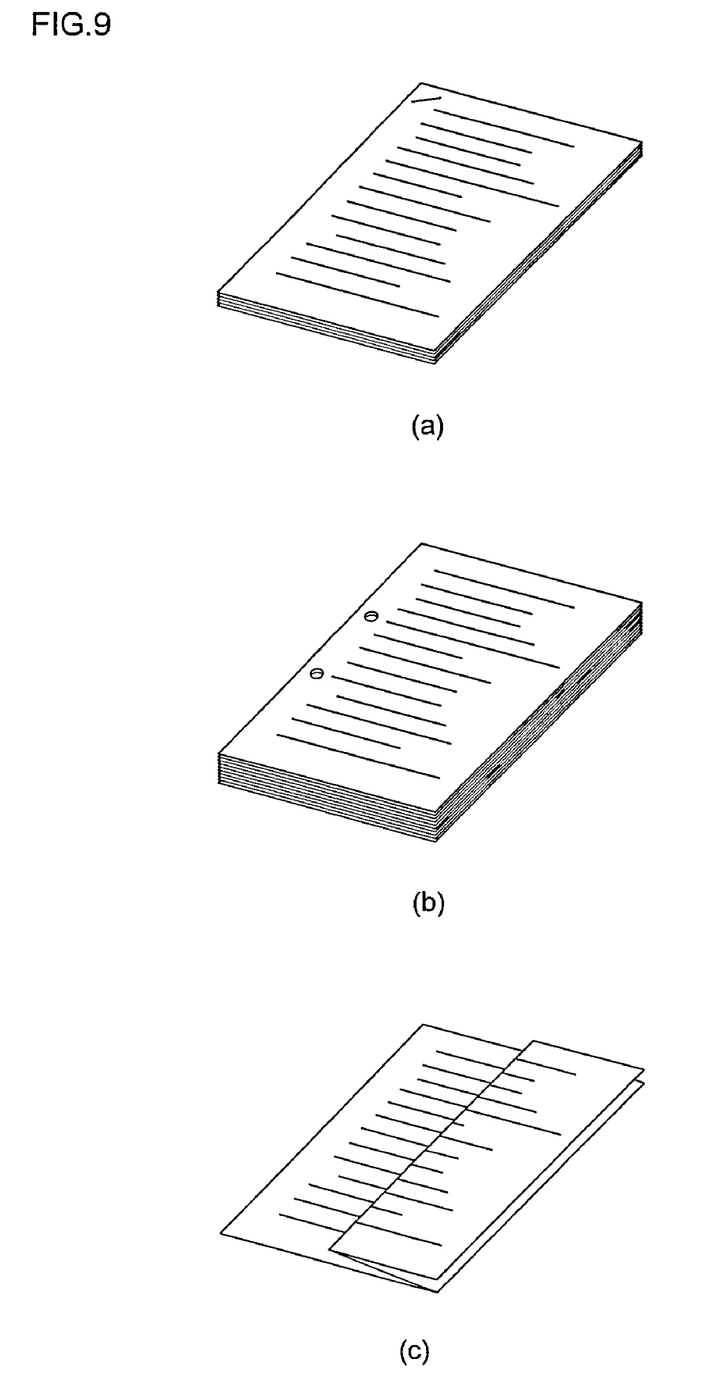
FIG. 9 is an illustration showing an exemplary form of a printed matter outputted by the image forming apparatus according to the present invention.

Through the processing described above, a reproduction of the same form as the document or a reproduction of a form similar to the document type is produced without causing the operator to perform complicated settings. FIG. 9 is an illustration showing an example of a printed matter outputted from the image forming apparatus according to the present invention. For example, a stapled reproduction shown in FIG. 9A is obtained from the document image of FIG. 8A. Further, a punched reproduction shown in FIG. 9B is obtained from the document image of FIG. 8B. Further, a folded reproduction shown in FIG. 9C is obtained from the document image having a fold line as shown in FIG. 8C.

Figure 10:
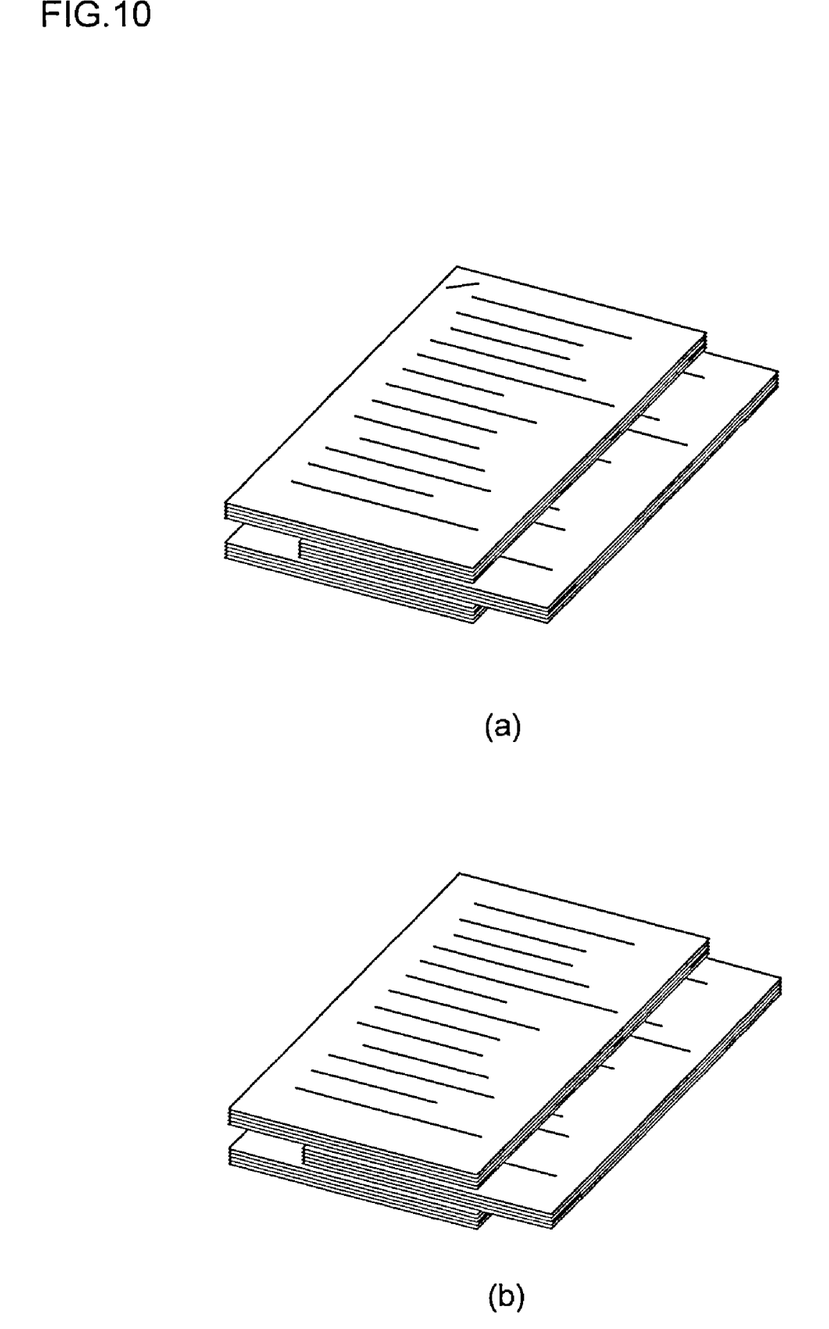
FIG. 10 is an illustration showing examples of printed matters of different forms outputted from the image forming apparatus according to the present invention.

Even in a case where it is impossible to create a reproduction same as the document, a reproduction in which substitute processing is performed can be obtained if appropriate substitute processing is possible. FIG. 9 is an illustration showing another example of a printed matter outputted from the image forming apparatus of the present invention. For example, it is preferable to produce three sets of reproductions shown in FIG. 10A from the document having staple marks in FIG. 8A. However, if a finishing device capable of stapling is not mounted, staple marks are eliminated and an output is performed such that each set is offset to be sorted as shown in FIG. 10B.

Second Embodiment

This embodiment shows an exemplary processing in which the front and back of the document are read, and if characteristics and positions thereof in the front and back coincide, they are extracted as characteristics of the document.

Figure 5:
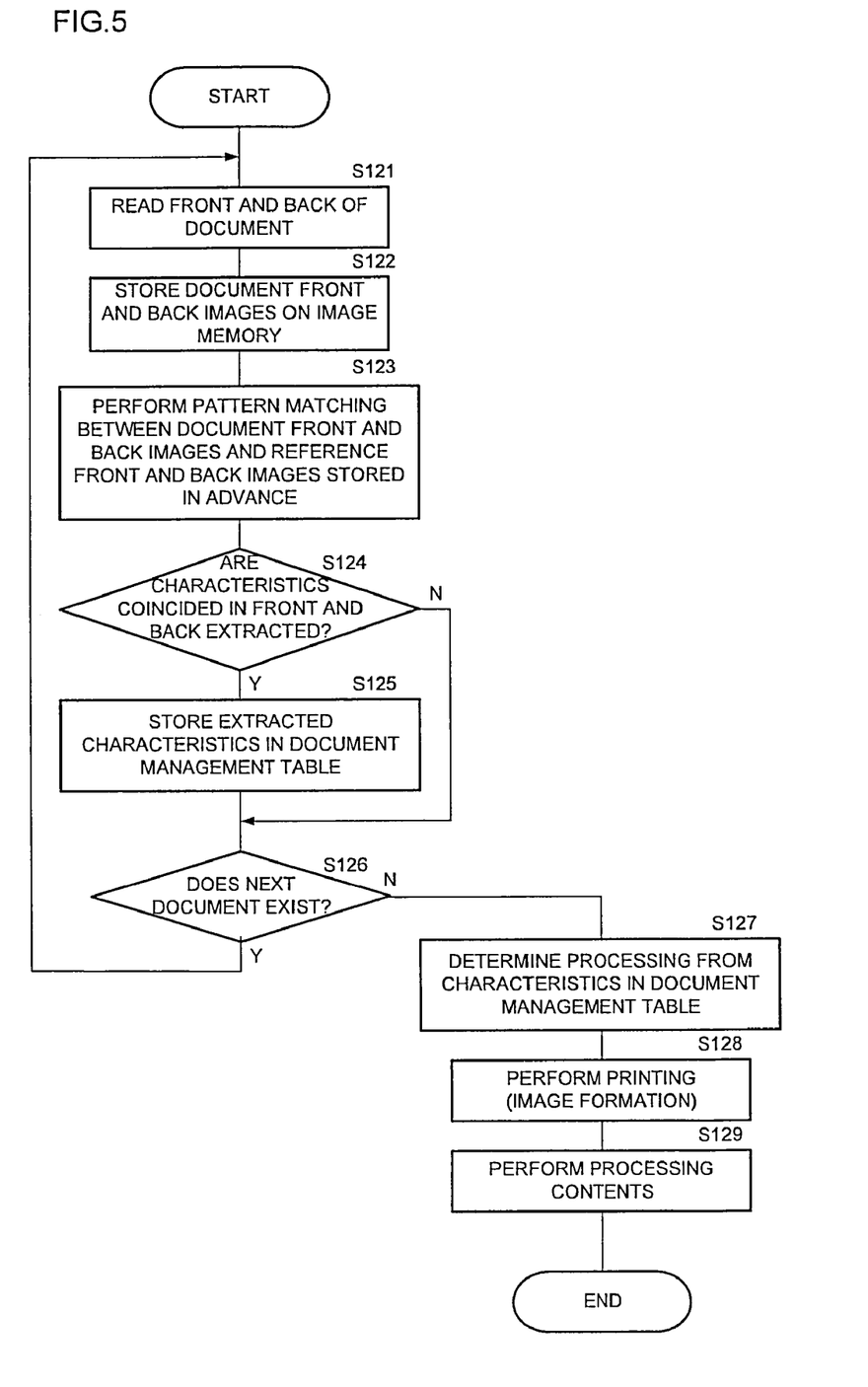
FIG. 5 is a flowchart showing an exemplary processing procedure of an image processing control section of a second embodiment.

FIG. 5 is a flowchart showing an example of a processing procedure of the image processing controller 6 in this embodiment. As shown in FIG. 5, the image processing controller 6 causes the scanner 2 to operate so as to read the front and back of the document (step S121). After the front and back of the document image are read and image-processed by the image data processor 4, the document image is stored in the image memory 5 (step S122). After the document image is stored in the image memory 5, the image controller 6 performs pattern matching between reference images stored in advance and the document image for extracting document characteristics (step S123).

Then, the document-type determining section 7 determines whether characteristics of the document are extracted through the pattern matching (step S124). Here, only in the case where it is determined same characteristics exist at corresponding positions in the front and back of the document, the characteristics are adopted as extraction result. For example, only in the case where it is determined that staple marks exist at corresponding positions in the front and back of the document, the document is determined as stapled. As for punching and folding, the document is determined as punched or folded only when it is determined that the marks exist at corresponding positions in the front and back of the document (step S124).

If the characteristics are extracted, the document-type determining section 7 stores determination result for storing attributes of each page in a field of the corresponding page of the document management table (step S125). In contrast, if no characteristic is extracted from the document image, it is determined that the page has no characteristic, so nothing is stored in the document management table.

After reading each page and performing the document type determination processing, the image controller 6 determines whether there is a next document (step S126). If there is a next document, the routine returns to step S121, and the next document is read and the document type determination processing is performed. In contrast, if it is determined that a next page does not exist, the image controller decides processing performed to the output as the processing deciding section 8. Therefore, the processing deciding section 8 refers to the characteristics of each page stored in the document management table, and decides processing performed to the printed output (step S127). Corresponding to the processing decided, the image forming section 9 performs printing (step S128), and the finishing device 13 performs processing decided (step S129).

As explained in the first embodiment, the processing deciding section 8 may determine whether the same processing as the document or appropriate substitute processing is possible, cause the display section 11 to display the determination result, and perform processing to urge the operator to input an instruction corresponding to the display.

Third Embodiment

This embodiment will explain an exemplary processing in which if characteristics and positions thereof in all pages of a set of document are coincided, they are extracted as characteristics of the document. As a processing form of the document, there is one in which a set of document is processed collectively. For example, stapling is performed collectively by a set section. This also applies to punching. On the other hand, folding is processing which is performed separately for each page.

Figure 6:
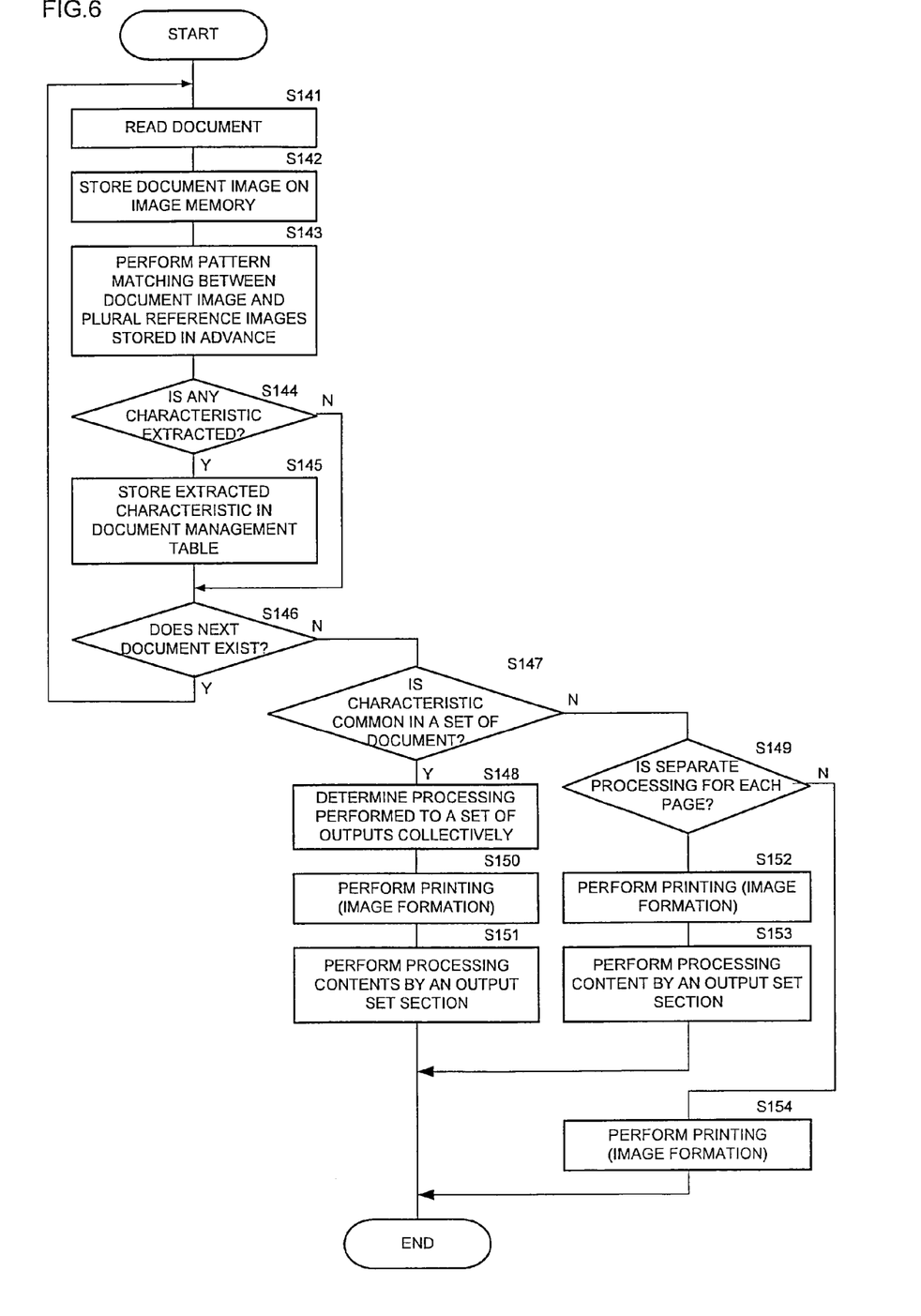
FIG. 6 is a flowchart showing an exemplary processing procedure of an image processing control section of a third embodiment.

FIG. 6 is a flowchart showing an example of processing procedure of the image processing controller 6 of this embodiment. The respective steps of S141 to S146 in FIG. 6 correspond to the respective steps of S101 to S106 in FIG. 4. The document-type determining section 7 stores characteristics of each page of the document in the document management table. Then, the image processing controller 6 decides processing to be performed to an output, as the processing deciding section 8. In order to do so, the processing deciding section 8 refers to the characteristics of each page stored in the document management table, and determines whether there are common characteristics in all pages of a set of document read (step S147). If the characteristics are those processed by a set section, the processing deciding section 8 decides processing performed to the corresponding printed output (step S148). Then, the image forming section 9 performs printing (step S150), and carries out the processing decided (step S151). For example, if it is determined that all pages of the document are stapled, stapling is performed to the output by a set section. Alternatively, if all pages of the document are punched, punching is performed to the output by a set section. However, even in a case where all pages of the document are folded, folding is processing performed to each page, so it is not determined as processing which should be performed by a set section, so whether folding is required or not is decided for each page.

As described in the first embodiment, the processing deciding section 8 may determine whether the same processing as the document or appropriate substitute processing is possible, and cause the display section 11 to display the determination result, and perform processing to urge the operator to input an instruction corresponding to the display.

In contrast, if there is no common characteristic in a set of document, the image processing controller 6 then determines whether there is a characteristic which should be processed separately for each page (step S149). Then, based on the determination result, processing is decided and the image forming section 9 performs printing (step S152). The finishing device 13 carries out the processing decided (step S153). For example, the finishing device 13 performs folding to the output page. However, although some pages have staple marks, stapling will not be performed since stapling is processing which should be performed by a set section. Punching will not be performed either even if some pages have punch hole marks, same as the case of stapling.

On the other hand, if there is no characteristic corresponding to separate processing performed to each page, printing is performed without performing special processing (step S154) to thereby output a reproduction.

What is claimed is:

1. An image forming apparatus comprising:
 a document reading section that can read an image of a document;
 a document-type determining section that can extract, when the image includes a finishing mark or a characteristic form, the finishing mark or the characteristic form as a characteristic portion from the readout document image, and can determine, based on the extracted characteristic portion, a type of the finishing or a type of the document;
 a processing deciding section that decides, based on the determined type of the finishing or the determined type of the document, a type of finishing to be performed to a medium to be output or a type of image processing to be performed to an image to be output; and
 a processor that performs finishing of the type decided by the processing deciding section to the medium to be output or image processing of the type decided by the processing deciding section to the image to be output.

2. The image forming apparatus of claim 1, wherein the finishing mark is a mark being left on the document as a result of the finishing being performed to the document.

3. The image forming apparatus of claim 1, wherein when the document has images on a front side and a back side of a sheet,
 the document reading section reads the images on both sides of the sheet, and the document-type determining section determines, when it extracts finishing marks of the same kind respectively provided on the readout images on both sides of the sheet, that the finishing has been performed to the document.

4. The image forming apparatus of claim 1, wherein when the document has images on each side of a plurality of sheets,
 the document reading section reads the images as one set, and the document-type determining section determines, when it extracts finishing marks of the same kind in each sheet of the set, that the finishing has been performed.

5. The image forming apparatus of claim 1, wherein the document-type determining section extracts a fold line of the document as the finishing mark.

6. The image forming apparatus of claim 1, wherein the document-type determining section extracts a staple mark of the document as the finishing mark.

7. The image forming apparatus of claim 1, wherein the document-type determining section extracts a punch mark of the document as the finishing mark.

8. The image forming apparatus of claim 1, wherein the processing deciding section decides that the same finishing which has been performed to the document should be performed to the medium to be output.

9. The image forming apparatus of claim 1, wherein the processing deciding section decides that processing as a substitute for the same finishing which has been performed to the document should be performed to the medium to be output or the image to be output.

10. The image forming apparatus of claim 1, wherein the image forming apparatus further comprises a notification section that notifies the operator of the type of finishing decided by the processing deciding section or the type of processing decided by the processing deciding section.

11. The image forming apparatus of claim 10, wherein the image forming apparatus further comprises a processing instruction section that allows the operator to input an instruction in response to the notification.

12. An image formation controlling method comprising:
 a document reading step of reading an image of a document;
 a document-type determining step of extracting, when the image includes a finishing mark or a characteristic form, the finishing mark or the characteristic form as a characteristic portion from the readout document image, and determining, based on the extracted characteristic portion, a type of the document or a type of the finishing;
 a processing deciding step of deciding, based on the determined type of the document or the determined type of the finishing, a type of finishing to be performed to a medium to be output or a type of processing to be performed to an image to be output; and a processing step of performing finishing of the type decided by the processing deciding section to the medium to be output or image processing of the type decided by the processing deciding section to the image to be output.

13. The image formation controlling method of claim 12, wherein the finishing mark is a mark being left on the document as a result of the finishing being performed to the document.

14. The image formation controlling method of claim 12, wherein when the document has images on both sides of a sheet, the document reading step is a step of reading the images on both sides of the sheet, and the document-type determining step is a step of determining, when finishing marks of the same kind respectively provided on the readout images on both sides of the sheet are extracted as the characteristic portion, that the finishing has been performed to the document.

15. The image formation controlling method of claim 12, wherein the document has images on each of a plurality of sheets, the document reading step is a step of reading the images as one set, and the document-type determining step is a step of determining, when finishing marks of the same kind one in each sheet of the set are extracted as the characteristic portion, that the finishing has been performed.

* * * * *